(12) United States Patent
Aguilar et al.

(10) Patent No.: US 6,269,444 B1
(45) Date of Patent: Jul. 31, 2001

(54) OPERATIONAL STATE SWITCHING APPARATUS AND METHOD FOR NETWORK COMPUTERS

(75) Inventors: Maximino Aguilar, Austin; James A. Brewer, Leander; John William Gorrell, Jr., Round Rock; Sanjay Gupta, Austin; James Michael Stafford, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/234,166

(22) Filed: Jan. 21, 1999

(51) Int. Cl.$^7$ ........................................... G06F 9/00
(52) U.S. Cl. .................... 713/1; 713/2; 713/300
(58) Field of Search .................... 713/1, 2, 300, 713/310, 323; 710/260, 267

(56) References Cited

U.S. PATENT DOCUMENTS

| | | | |
|---|---|---|---|
| 5,303,390 | * | 4/1994 | Little ........................................ 714/1 |
| 5,398,333 | * | 3/1995 | Schieve et al. ........................ 714/36 |
| 5,598,573 | * | 1/1997 | Hall et al. ............................. 711/111 |
| 5,864,702 | * | 1/1999 | Walsh et al. ......................... 713/320 |

* cited by examiner

*Primary Examiner*—Dennis M. Butler
(74) *Attorney, Agent, or Firm*—Casimer K. Salys; Russell D. Culbertson; Shaffer & Culbertson,LLP

(57) ABSTRACT

A system reset arrangement (12) resides alternately in an enabled condition or a disabled condition. When the system reset arrangement (12) is in the disabled condition, a switching input provided through a switch (11) does not effect a system reset. However, in the enabled condition, the switching input through the switch (11) causes system reset arrangement (12) to produce a reset output which resets the system. A reset disable arrangement (14) maintains the system reset arrangement (12) in the disabled condition in response to a disable input. When the disable input is removed, reset disable arrangement (14) maintains system reset arrangement (12) in the enabled condition. An interrupt output (15) develops an interrupt signal in response to the switching input. This interrupt signal prompts an interrupt controller (16) to issue a desired system management command to be processed by the system processor.

This command may place the system in a standby mode and, in any event, removes the disable input, causing the reset disable arrangement (14) to maintain the system reset arrangement (12) in an enabled condition. Thus, activating the switch (11) while the computer is in a normal operational state causes the computer to go into a standby state; and, activating the switch (11) while the computer is in the standby state causes the computer to reset back to the normal operational state.

19 Claims, 2 Drawing Sheets

OPERATIONAL STATE SWITCHING APPARATUS AND METHOD FOR NETWORK COMPUTERS

TECHNICAL FIELD OF THE INVENTION

This invention relates to computer systems and, more particularly, to an apparatus and method for switching a computer between operational states.

BACKGROUND OF THE INVENTION

Individual computers are commonly connected together in networks. The network connections facilitate communications between the individual computers and also allow processing tasks to be distributed to the individual computers. Various other processing devices may be connected in a network along with one or more computers. For example, a network may connect several individual computers, communications devices, environmental systems, and security systems. As the term is used in this disclosure, a "network" shall comprise any arrangement of processing devices in which the individual devices or systems are adapted to communicate with each other. A network may include individual computers, such as individual personal computers for example, along with other devices which include a processor.

A network requires a management system for managing communications between the individual devices included in the network and for managing processes distributed throughout the network. A network management system may also manage software associated with the individual devices or systems included in the network. In order to manage the network, the network management system may require constant access to the individual devices or systems which are included in the network. This access allows the network management system to perform functions on the individual devices or systems. Thus, the individual devices included in the network preferably remain in an operational state at all times, ready to process instructions from the network management system.

Although individual devices included in a network may be required to remain in an operational state at all times, leaving individual network devices continuously in a fully operational state can raise certain operational problems. Leaving all network devices operational and fully powered may result in unnecessary wear on certain components of the individual devices or systems. Also, leaving each device in a fully operational state is wasteful in terms of energy usage. Although some computer systems may include components which may be powered down or placed in a standby state by software instruction, these systems commonly place various components in a standby state only after a predetermined period of non-use.

SUMMARY OF THE INVENTION

It is an object of invention to provide a switching apparatus and method for switching an individual device or system between a fully operational state and a standby operational state which does not interfere with network management operations.

The apparatus according to the invention includes a switch which may be operated alternatively to reset the system or place the individual system in a standby state. Activating the switch when the system is in a normal operational state initiates an interrupt signal which causes the system to go into the desired standby state. Activating the switch when the system is already in the standby state results in a system reset which places the system once again in the normal operational state. The preferred standby state preferably simulates an "off" condition in which the system is powered down but remains operational and ready to receive network management instructions.

In the preferred form of the invention, the switch comprises a manually operated switching device and may be activated to provide a switching input for both a system reset arrangement and an interrupt arrangement. The apparatus also includes a reset disable arrangement. The reset disable arrangement maintains the system reset arrangement in a disabled condition in response to a disable input, and maintains the system reset arrangement in an enabled condition when the disable input is removed. In the disabled condition, the system reset arrangement is unresponsive to the switching input and therefore cannot reset the system in response to a switching input. However, in the enabled condition, the system reset arrangement responds to a switching signal to produce a system reset output which results in a reset of the processor included in the individual computer system.

When the computer system according to the invention performs a system reset, the computer system preferably defaults to a condition in which the reset arrangement is enabled, then the processor included in the computer system executes a software instruction which causes the disable input to be applied to the reset disable arrangement. Thus, in normal operation the system reset arrangement is disabled and will not respond to a switching input to initiate another reset. However, in this normal operational state, the interrupt arrangement responds to a switching input by producing an interrupt output. An interrupt controller receives this interrupt output and issues an instruction preferably causing the system processor to power down various components and place the individual system in the standby state. The individual system remains operational in this standby state and ready to receive network management instructions. The instruction dictated by the interrupt output signal also causes the processor to remove the disable input from the reset disable arrangement, and thereby places the system reset arrangement in the enabled condition. When the switch is next activated, the switching arrangement according to the invention initiates a system reset which returns the system to the normal, fully operational state.

The switching arrangement according to the invention allows an operator to place their individual network computer system or other network system or device in a simulated "off" or standby operational state. In this standby state, the system remains operational and ready to accept network communications, or to return to the fully operational state when the switch is activated again.

These and other objects, advantages, and features of the invention will be apparent from the following description of the preferred embodiments, considered along with the accompanying drawings.

DESCRIPTION OF THE PREFERRED EMBODIMENTS

Figure 1:
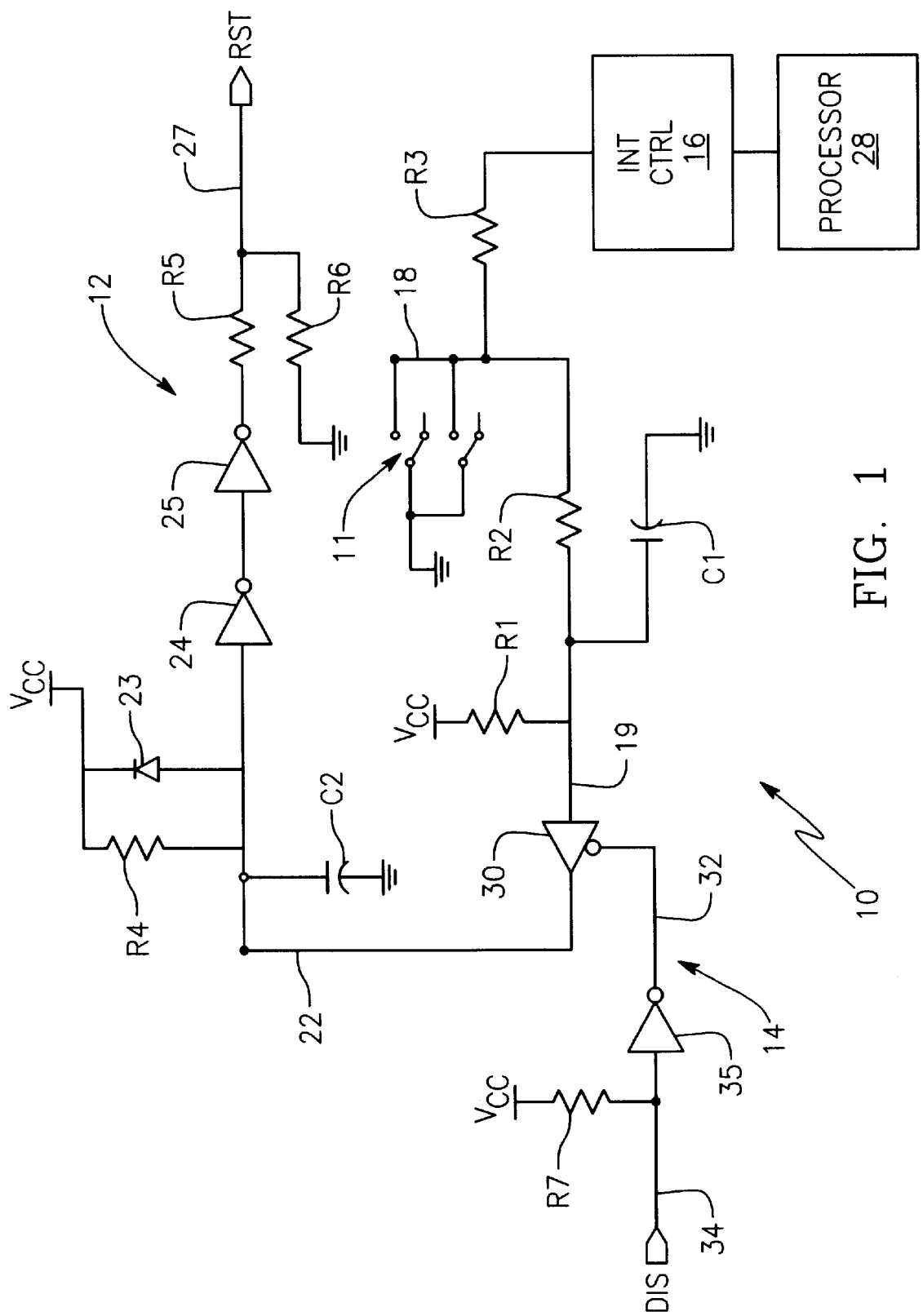
FIG. 1 is an electrical schematic diagram showing a switching arrangement embodying the principles of the invention.

Referring to FIG. 1, a switching arrangement 10 embodying the principles of the invention includes a switch 11, a system reset arrangement shown generally at reference numeral 12, and a reset disable arrangement shown generally at reference numeral 14. Switching arrangement 10 also includes an interrupt output node 15 connected to provide an interrupt output signal to an interrupt controller 16.

Switch 11 is connected between ground and a switching node 18. Although switch 11 is illustrated as a double pole, double throw switch, many alternative switching devices may be used within the scope of the invention. According to the logic of the circuit illustrated in FIG. 1, switch 11 is biased to the open position. An operator may produce a switching input by closing switch 11, thereby coupling switching node 18 to ground.

As used in this disclosure, voltage signals or states at the various nodes of the circuit illustrated in FIG. 1 will be described as either high level voltages or low level voltages. A high level voltage represents one logical state whereas a low level voltage represents the opposite logical state. Preferably, any voltage signal within a high level range comprises a high level signal while any voltage signal within a low level range comprises a low level signal. Thus, a reference to a high level voltage signal means a voltage signal in the high level range and representing one logical state, while a reference to a low level voltage signal means a voltage in the low level range representing the opposite logical state. The range of high and low voltage levels may vary from node to node. In any event, the invention is not limited to any particular high or low level voltage signals or high and low level voltage ranges.

When switch 11 is open, switching node 18 is held at a logical high level voltage by the pull-up voltage source $V_{cc}$. Resistor R1 is connected between pull-up voltage source $V_{cc}$ and node 19, while resistor R2 is connected between node 19 and switching node 18. Capacitor C1 is connected between node 19 and ground. When switch 11 is closed, the voltage at switching node 18 goes essentially to zero. This low level voltage signal at switching node 18 results in a low level voltage signal at node 19 and at interrupt output node 15, which is connected to the switching node through resistor R3. The low level voltage signal at node 15 represents an interrupt output to interrupt controller 16. The effect of this interrupt signal will be described below with particular reference to FIG. 2. The low level voltage signal at node 19 will be discussed below with reference to reset disable arrangement 14.

System reset arrangement 12 includes a reset control node 22 connected to pull-up voltage source $V_{cc}$ through resistor R4 and diode 23. A capacitor C2 is connected between reset control node 22 and ground. The illustrated system reset arrangement 12 further includes a buffer arrangement which preferably includes a first inverter circuit 24 and a second inverter circuit 25 connected in series with resistor R5 between reset control node 22 and a reset output node 27. Reset output node 27 is connected to ground through resistor R6.

A logical high level voltage signal at reset control node 22 is inverted twice through inverters 24 and 25 to produce a high level voltage signal at reset output node 27. On the other hand, a low level voltage signal at reset control mode 22 results in a low level voltage signal at reset output node 27. In the illustrative example of the invention, a low level signal at reset output node 27 represents a system reset output. This system reset output signal is communicated to a processor 28 to reset the individual system with which switching arrangement 10 is associated.

Reset disable arrangement 14 includes a switchable buffer circuit 30 having an input connected to node 19 and an output connected to reset control node 22. A gating input node 32 is connected to switchable buffer circuit 30 and carries a gating signal which controls the operation of the switchable buffer circuit. Reset disable arrangement 14 also includes a disable input node 34 connected to pull-up voltage source $V_{cc}$ through resistor R7. An inverter circuit 35 has its input coupled to disable input node 34 and its output coupled to gating input node 32.

Reset disable arrangement 14 selectively maintains system reset arrangement 12 in either an enabled condition or a disabled condition. In the enabled condition, the signal at reset control node 22 follows the signal at switching node 18 and node 19. Thus, when the reset arrangement is in the enabled condition, closing switch 11 results in a logical low level voltage signal at switching node 18, node 19, and reset control node 22. The low level signal at reset control node 22 in turn causes the buffer arrangement of inverters 24 and 25 to produce a low level signal, that is, a reset output at reset output node 27. However, when system reset arrangement 12 is in the disabled condition, the voltage signals at switching node 18 and node 19 have no effect on reset control node 22. Thus, when system reset arrangement 12 is in the disabled condition, a system reset cannot be effected by closing switch 11 and producing a switching input at switching node 18.

A high level voltage signal at disable input node 34 is inverted at inverter 35 to produce a low level voltage signal at gating input node 32. This low level signal at gating input node 32 causes circuit 30 to produce a high level output to reset control node 22 regardless of the signals at switching node 18 and node 19. However, a low level voltage signal at disable input node 34 is inverted by inverter 35 to produce a high level signal at gating input node 32. This high level signal at gating input node 32 allows the output of circuit 30 to follow the signal at node 19 and switching node 18. Thus, a high level signal at switching input node 18 and node 19 results in a high level output from circuit 30 to reset node 22 and, alternatively, a low level voltage signal at switching input node 18 and node 19 results in a low level output from circuit 30 to system reset node 22 and a low level signal, or reset output at reset output node 27.

Figure 2:
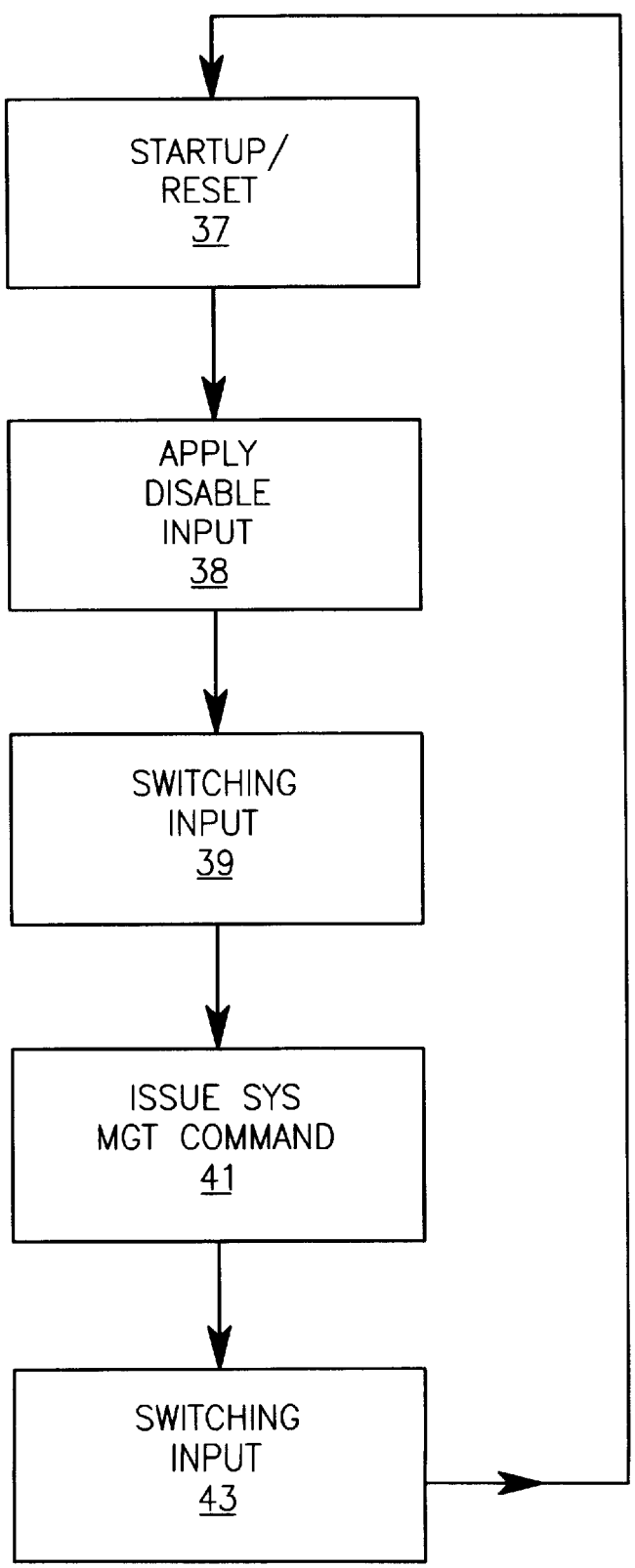
FIG. 2 is a block diagram illustrating a switching process embodying the principles of the invention.

The operational state switching process performed by the circuit shown in FIG. 1 may be described with reference to both FIG. 1 and the process flow chart of FIG. 2. According to the invention, the signal state at disable input node 34 (FIG. 1) is controlled by software instruction. This software instruction is executed by the processor 28 included in the computer or other processing system with which switching arrangement 10 is associated. Referring to FIG. 2, upon system startup or reset at block 37, the reset arrangement 12 (FIG. 1) first preferably defaults to an enabled condition and then the system processor 28 executes a software instruction at block 38 to apply a high level signal (disable input) at disable input node 34 (FIG. 1). This instruction may be directed to the processor 28 in any suitable fashion. For example, the instruction executed at block 38 may be part of the system boot instructions or may be an instruction called automatically after booting the system and loading an operating system.

With a high level voltage signal (disable input) at disable input node 34, circuit 30 produces a high level output to reset control node 22. This high level voltage signal at reset control node 22 causes a high level voltage signal to be maintained at reset output node 27 ensuring that the processor 28 is not reset. When, at block 39, the system operator closes or activates switch 11 to produce a low level voltage signal or switching input at switching node 18, circuit 30 drives or maintains the high level voltage signal at reset control node 22 despite the low level voltage signal at switching node 18. Thus, the switching input does not affect the signal at reset control node 22 or at reset output node 27. The high level disable input at disable input node 34 causes the reset disable arrangement to effectively isolate the system reset arrangement 12 from the signal state at switching node 18.

However, the low level voltage signal or switching input at switching node 18, results in a low level voltage signal at interrupt output node 15 and this low level voltage signal represents an interrupt signal to interrupt controller 16. As shown at process block 41 in FIG. 2, interrupt controller 16 (FIG. 1) responds to the interrupt signal by issuing a system management command to be executed by the system processor 28. The preferred system management command powers down certain components of the computer system and places the system components in a standby state. Regardless of the system management functions dictated by the system management command, the command also directs the processor 28 to remove the high level disable input signal at disable input node 34 (FIG. 1) and apply a low level voltage signal to the disable input node. As discussed above with reference to FIG. 1, the low level voltage signal at disable input node 34 places system reset arrangement 12 in an enabled condition in which the signal level at reset control node 22 follows, or is driven by, the signal at switching node 18. In this enabled condition, the next time switch 11 is closed, as shown at block 43 in FIG. 2, the resulting low level voltage signal at switching node 18 and node 19 causes circuit 30 to produce a low level signal at reset control node 22. The low level voltage signal at reset control node 22 results in a low level voltage signal (reset output) at reset output node 27. This reset output signal causes the processor 28 to reset, as shown at block 37 in FIG. 2, and begin a new loop through the switching process. Thus, the switching input applied through switch 11 alternatively switches the system to a normal operational state by resetting the system, or switches the system to a desired standby operational state.

The preferred embodiment of the invention illustrated in FIG. 1 employs logic in which the interrupt signal and reset output signal comprise low voltage level signals. Other embodiments of the invention may reverse this logic by appropriate circuitry. Such implementations are to be considered equivalents of the illustrated circuit. Similarly, although the illustrated circuit 10 disables the system reset arrangement 12 in response to a logical high level signal at disable input node 34, this logic may also be reversed by appropriate circuitry. This alternate logic is to be considered an equivalent to that disclosed in FIG. 1 and described above.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the invention is discussed above as resetting the processor 28 to return the system to a normal operational state, the system may be returned to the normal operational state by software instruction. This software instruction may be initiated by the signal at the reset output node 27.

What is claimed is:

1. A switching arrangement for switching the operational state of a computer, the switching arrangement comprising:
   (a) a switch for providing a switching input;
   (b) a system reset arrangement residing alternately in an enabled condition and a disabled condition, the system reset arrangement producing a system reset output in response to the switching input when in the enabled condition, and being unresponsive to the switching input when in the disabled condition;
   (c) a reset disable arrangement for maintaining the system reset arrangement in the disabled condition in response to a disable input, and for maintaining the system reset arrangement in the enabled condition in the absence of the disable input; and
   (d) an interrupt arrangement for providing an interrupt output in response to the switching input.

2. The apparatus of claim 1 wherein the system reset arrangement includes:
   (a) a buffer arrangement connected between a reset control node and a reset output node, the buffer arrangement producing the system reset output at the reset output node in response to a first level signal at the reset control node.

3. The apparatus of claim 2 wherein the buffer arrangement includes:
   (a) a first inverter circuit;
   (b) a second inverter circuit; and
   (c) a pull-up voltage source connected to the reset control node.

4. The apparatus of claim 1 wherein the switch is connected between a reference voltage and a switching node.

5. The apparatus of claim 4 wherein the interrupt arrangement comprises an interrupt output node connected to the switching node.

6. The apparatus of claim 4 wherein the reset disable arrangement comprises a switchable device having a gating input, a first input connected to the switching node, and an output coupled to the reset control node.

7. The apparatus of claim 6 wherein the reset disable arrangement further comprises:
   (a) a disable input node connected to receive the disable input; and
   (b) a buffer device coupled between the gating input and the disable input node.

8. The apparatus of claim 1 wherein:
   (a) the disable input is applied to the reset disable arrangement upon system reset.

9. The apparatus of claim 8 further comprising:
   (a) an interrupt controller for receiving the interrupt output and responding to the interrupt output by issuing a system management command.

10. The apparatus of claim 9 wherein the system management command directs that the disable input be removed from the reset disable arrangement.

11. A switching arrangement for switching the operational state of a computer, the switching arrangement comprising:
    (a) a manual operator input switch connected to a switching node;
    (b) an interrupt output node connected to the switching node;
    (c) an interrupt controller connected to the interrupt output node;
    (d) a system reset arrangement coupled between a reset control node and a reset output node; and
    (e) a reset disable arrangement having an input connected to the switching node, an output coupled to the reset control node, and a disable input node, the reset disable arrangement responding to a disable signal on the disable input node by preventing the signal on the switching node from affecting the reset control node, the reset disable arrangement responding to the absence of the disable signal at the disable input node by enabling the signal at the reset control node to follow the signal at the switching node.

12. The apparatus of claim 11 wherein:

(a) the disable input is applied to the disable input node in response to a system reset.

13. The apparatus of claim 12 wherein:

(a) the interrupt controller is adapted to issue a system management command in response to an interrupt signal at the interrupt output node.

14. The apparatus of claim 13 wherein the system management command directs that the disable input be removed from the disable input node.

15. A method of switching the operational state of a computer, the method comprising the steps of:

(a) upon system reset, isolating a system reset arrangement from a switching node and driving the system reset arrangement to prevent a system reset;

(b) applying a switching input from the switching node to produce an interrupt signal; and (c) in response to the interrupt signal, driving the system reset arrangement utilizing the switching input at the switching node.

16. The method of claim 15 further comprising the step of:

(a) executing a system management command in response to the interrupt signal.

17. The method of claim 16 wherein the system management command includes an instruction to power down components of the computer.

18. The method of claim 17 wherein the system management command includes an instruction to remove a disable input from a reset disable arrangement interposed between the switching node and system reset arrangement.

19. The method of claim 15 wherein the step of driving the system reset arrangement utilizing the switching input comprises:

(a) removing a disable input from a reset disable arrangement interposed between the switching node and system reset arrangement.

\* \* \* \* \*